US011089592B2

(12) United States Patent
Teboulle et al.

(10) Patent No.: US 11,089,592 B2
(45) Date of Patent: Aug. 10, 2021

(54) COMMUNICATION METHOD EXECUTED IN A LONG-RANGE WIRELESS NETWORK AND AFFORDING LOW ENERGY CONSUMPTION AND LOAD MANAGEMENT

(71) Applicant: SAGEMCOM ENERGY & TELECOM SAS, Rueil Malmaison (FR)

(72) Inventors: Henri Teboulle, Rueil Malmaison (FR); Marc Le Gourrierec, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 17/043,380

(22) PCT Filed: Mar. 25, 2019

(86) PCT No.: PCT/EP2019/057456
§ 371 (c)(1),
(2) Date: Sep. 29, 2020

(87) PCT Pub. No.: WO2019/185552
PCT Pub. Date: Oct. 3, 2019

(65) Prior Publication Data
US 2021/0092738 A1    Mar. 25, 2021

(30) Foreign Application Priority Data

Mar. 30, 2018  (FR) ...................................... 1852801
May 23, 2018  (FR) ...................................... 1854305

(51) Int. Cl.
*H04W 88/16*     (2009.01)
*H04W 72/04*     (2009.01)
(Continued)

(52) U.S. Cl.
CPC ......... *H04W 72/0446* (2013.01); *H04L 47/24* (2013.01); *H04W 56/001* (2013.01);
(Continued)

(58) Field of Classification Search
CPC .... H04W 72/0446; H04L 47/22; H04L 47/24; H04L 29/06884
See application file for complete search history.

(56) References Cited

U.S. PATENT DOCUMENTS

2008/0253386 A1* 10/2008 Barum .................... H04L 45/00
                                                                    370/406
2018/0164398 A1*  6/2018 Olsen ........................ G01S 5/30
2019/0150134 A1*  5/2019 Kakinada .............. H04L 67/125
                                                                    370/330

FOREIGN PATENT DOCUMENTS

WO     2016/174396 A1    11/2016
WO     2018/011792 A1     1/2018

OTHER PUBLICATIONS

Apr. 29, 2019 International Search Report issued in International Patent Application No. PCT/EP2019/057456.
(Continued)

*Primary Examiner* — Salvador E Rivas
(74) *Attorney, Agent, or Firm* — Oliff PLC; R. Brian Drozd

(57) ABSTRACT

A communication method, executed in a network of the LoRa type wherein terminals communicate with a server by means of gateways in a set of gateways, each gateway being associated with a set of terminals comprising at least one terminal using said gateway to communicate with the server. The method enables a second gateway to relay, in a downlink frame, a response to a message received in an uplink
(Continued)

frame by a first gateway, different from the second gateway, even if the second gateway has not received the uplink frame.

17 Claims, 6 Drawing Sheets

(51) Int. Cl.
  *H04W 56/00* (2009.01)
  *H04L 12/851* (2013.01)
  *H04L 29/08* (2006.01)
  *H04L 12/815* (2013.01)
  *H04L 29/06* (2006.01)
(52) U.S. Cl.
  CPC ....... *H04W 88/16* (2013.01); *H04L 29/06884* (2013.01); *H04L 47/22* (2013.01); *H04L 67/02* (2013.01)

(56) References Cited

OTHER PUBLICATIONS

Apr. 29, 2019 Written Opinion issued in International Patent Application No. PCT/EP2019/057456.

* cited by examiner

COMMUNICATION METHOD EXECUTED IN A LONG-RANGE WIRELESS NETWORK AND AFFORDING LOW ENERGY CONSUMPTION AND LOAD MANAGEMENT

The invention relates to a communication method executed in a long-range wireless network and affording low energy consumption, and a device and a system implementing the method.

The internet is gradually transforming into a wide-area network, called the "Internet of Things", connecting all kinds of objects that have become connectable. New requirements in terms of networks have then appeared, and in particular requirements for wireless networks having greater coverage than conventional cellular networks and making it possible to limit energy consumption of the equipment connected. Among these long-range wireless networks affording low energy consumption ("Low Power Wide Area Network (LPWAN)"), mention can be made of networks based on the LoRa (registered trade mark) ("Long Range") technology. LoRa technology operates on frequency bands known by the term "ISM" (Industry, Science and Medical) band comprising frequency bands that can be used freely for industrial, scientific and medical applications. LoRa technology is based on a spread-spectrum technology making it possible to obtain low-bitrate communications having good robustness in a particularly noisy ISM band.

A network based on LoRa technology (referred to as "LoRa network" hereinafter) uses a protocol called LoRaWAN. A LoRa network is composed of base stations or gateways generally placed on high points in order to cover a large geographical zone. The gateways are able to detect messages sent in their zone by equipment or terminals ("endpoints") and to transfer them to at least one server (LoRa network server (LNS)), which will process them.

In a conventional functioning of a LoRa network, a terminal wishing to transmit a message (i.e. data) to the server transmits this message in a frame, referred to as an uplink frame, in accordance with the LoRaWAN protocol. The uplink frame is transmitted in broadcast mode. This uplink frame is received by at least one gateway. Each gateway that has received the frame decodes it and retransmits the message to the server in an HTTP (Hypertext Transfer Protocol) request. If a plurality of gateways have received the frame, the server receives the plurality of HTTP requests containing the message. The server must then designate, among the gateways that have received the uplink frame, the gateway to be used for relaying a response to the message contained in the uplink frame. The response is transmitted from the server to the designated gateway in an HTTP request, and then in unicast mode, from the designated gateway to the terminal in a downlink frame in accordance with the LoRaWAN protocol. In a majority of implementations of LoRa networks, the designated gateway is the one offering the best transmission quality with the terminal that sent the uplink frame. One drawback of these implementations is that the relaying of the responses to uplink frames between the server and the terminals is often provided by the same gateways, which may cause congestion on the downlink channel of these gateways.

Another particularity of LoRa networks is that the gateways are equipment functioning in a half-duplex mode. Consequently a gateway cannot send and receive terminal data simultaneously. This is because LoRa gateways have very high transmission levels, around +27 dBm, with respect to their reception level, which may be around −140 dBm. Such a difference between the transmission and reception levels means that a transmission of a message would considerably interfere with a simultaneous reception of a message, although transmissions and receptions use two different frequency bands. This constraint in using gateways functioning in half-duplex mode greatly impairs the performances of LoRa networks. One possible solution would consist of dividing the gateways into a transmission part and a reception part and to geographically separate these two parts. This solution, which would enable the gateways thus arranged to transmit and receive simultaneously (the gateways would thus become equipment functioning in full-duplex mode) poses a problem of synchronisation between the two parts. This is because a gateway designated by a server for relaying a response to a message that it has received must transmit the response at an instant fixed by the server. This instant is calculated by the server by adding a predefined period to an instant of reception of the uplink frame containing the message by said gateway. However, the transmission instant is calculated in a time base of the reception part of the gateway which, without synchronisation between the transmission part and the reception part of the gateway, is not known to the transmission part. Problems of synchronisation between distant items of equipment are usually solved by inserting, in each item of equipment, a module for synchronisation on a common clock such as a GPS (Global Positioning System) module. However, inserting a GPS module in each gateway would increase both the cost and the complexity of the networks.

It is desirable to overcome these drawbacks of the prior art. It is in particular desirable to propose a method that enables a LoRa network comprising only gateways functioning in half-duplex mode to offer a full-duplex functionality, the full-duplex functionality being obtained without the insertion of a module for synchronisation on a common clock in each gateway. In addition, it would be desirable for this method to make it possible to prevent the relaying of the responses to the messages from the terminals always approaching the same gateways.

It is moreover desirable to propose a method that is simple to implement at low cost.

According to a first aspect of the present invention, the present invention relates to a communication method executed in a long-range wireless network and affording low energy consumption wherein terminals communicate with a server by means of gateways in a set of gateways according to a communication technology meaning that, when the server receives a message from a terminal via a first gateway, it fixes an instant at which a gateway must relay a response to said message according to an instant of reception of said message by said first gateway, each gateway being associated with a set of terminals comprising at least one terminal using said gateway for communicating with the server. The method used by the server comprises: receiving a request coming from a first gateway containing a message sent in a frame, referred to as an uplink frame, by a terminal, referred to as the sending terminal; determining a second gateway different from the first gateway to be used for relaying a response to said message intended for the sending terminal, the second gateway being determined in a subset of gateways in the set of gateways comprising the first gateway and at least one second gateway, each gateway in the subset being capable of relaying to a terminal a response to a message transmitted in an uplink frame by said terminal received by any other gateway in said subset, the gateways in the subset having at least one terminal associated in common and being associated with the sending terminal; transmitting a request containing said response to the second gateway, said response being retransmitted by the second gateway to said sending terminal in a frame, referred to as a downlink frame, at an instant indicated in the request, said instant being indicated in a time reference of the first gateway, the second gateway taking into account a clock difference between the first and second gateways in order to transmit a downlink frame at said instant.

According to one embodiment, the communication technology is the LoRa technology and each frame exchanged between a gateway and a terminal is in accordance with the LoRaWAN protocol.

According to one embodiment, the set of gateways comprises a plurality of subsets of gateways, each subset being formed by an operator from gateways able to stand in for each other in order to relay a response in a downlink frame to a message received in an uplink frame by one of them or by an adaptive procedure of formation of the subsets performed periodically under the control of the server with a predefined period.

According to one embodiment, the server transmits, to each gateway included in a subset, characteristics of said subset comprising an identifier for each gateway included in said subset and an identifier for each terminal associated in common between the gateways in the subset.

According to one embodiment, the adaptive procedure of formation of the subsets comprises: classifying the gateways in the set of gateways by decreasing order of the number of downlink frames that each gateway has sent during the last predefined period or by decreasing order of the number of uplink frames that each gateway has received during the last predefined period; running through the gateways thus classified in their classification order and, for each gateway, classifying each terminal associated with said gateway by decreasing order of the number of uplink frames received from said terminal by said gateway during the last predefined period; running through the gateways in the classification order thereof and, for each gateway, defining a subset of gateways from said gateway, said gateway being referred to as the base gateway, belonging to said subset, the definition of the subset comprising: as long as a number of terminals in a first set of terminals associated with the subset of gateways being defined is higher than a predefined percentage of the number of terminals in a second set of terminals associated with the base gateway: identifying, among the gateways thus classified that have not yet been inserted in the subset, a gateway having the most terminals in common with the base gateway; inserting the gateway thus identified in the subset, and forming the first set of terminals as an intersection between the second set of terminals and each set of terminals associated with a gateway inserted in the subset; and eliminating each terminal included in the first set of terminals from the sets of terminals associated with the gateways thus classified.

According to one embodiment, when the gateways are classified by decreasing order of the number of downlink frames that each gateway has sent during the last predefined period, only the gateways that have sent at least a predetermined number of downlink frames during the last predefined period are classified and, when the gateways are classified by decreasing order of the number of uplink frames that each gateway has received during the last predefined period, only the gateways that have received at least one predetermined number of uplink frames during the last predefined period are classified.

According to one embodiment, when a gateway has been inserted in a subset formed from one base gateway, this gateway can no longer be inserted in a subset formed from all other base gateways.

According to one embodiment, the adaptive procedure of forming the subsets stops when all the classified gateways have been inserted in a subset or when all the terminals in the network are included in a set of terminals associated with a subset.

According to one embodiment, the clock difference existing between two gateways is determined by a synchronisation procedure, the synchronisation procedure being executed by one of the two gateways, referred to as an initiating gateway, in collaboration with the other gateway, referred to as a collaborating gateway, and comprising: transmitting an uplink frame intended for the collaborating gateway, the initiating gateway waiting during a predetermined period before listening out for a response to said uplink frame, said response being transmitted in a downlink frame by the collaborating gateway after a period equal to the predetermined period following a reception of said frame by the collaborating gateway, a first item of information representing an instant of reception of said request by the collaborating gateway to which the duration of the predetermined period being inserted in said response by the collaborating gateway has been added; receiving said response and obtaining a second item of information representing an instant of reception of said response by the second gateway; and calculating the clock difference between the initiating gateway and the collaborating gateway as a difference between the second and first items of information.

According to one embodiment, the synchronisation procedure is executed in each subset for each pair of possible gateways in said subset, each gateway in a pair of gateways being alternately initiating or collaborating, at predefined regular intervals or adaptive intervals with durations dependent on a change in the clock differences over time.

According to one embodiment, the second gateway is determined randomly in the subset of gateways comprising the first gateway or randomly among a predefined number of gateways in said subset offering a quality of communication with the sending terminal that is the highest among the gateways in said subset.

According to one embodiment, the second gateway is determined by taking into account a counter value representing the number of downlink frames transmitted by the gateways in said subset in response to messages transmitted in uplink frames by terminals.

According to one embodiment, the second determined gateway is associated with the counter value that is lowest among the counter values associated with the gateways in said subset.

According to one embodiment, the second gateway is determined by executing a choice procedure comprising: preselecting a predefined number of gateways associated with the lowest counter values among the counter values associated with the gateways in said subset; choosing a gateway associated with a value representing a quality of communication with the sending terminal that is higher than or equal to a predefined quality threshold among the gateways in the predefined number of preselected gateways, the chosen gateway becoming the second gateway.

According to one embodiment, when no gateway in the predefined number of gateways is associated with a value representing a quality of communication with the sending terminal higher than or equal to the predefined quality threshold, choosing a gateway in the subset associated with the lowest counter value among the values of counters associated with the gateways in said subset and associated with a value representing a quality of communication with the sending terminal higher than or equal to the predefined quality threshold; and, if no gateway in said subset is associated with a value representing a quality of communication with the sending terminal higher than or equal to the predefined quality threshold, choosing a gateway associated with the value representing a quality of communication with the sending terminal that is maximum among the values representing a quality of communication with the sending terminal that are associated with the gateways in said subset.

According to one embodiment, when the server receives a plurality of requests each containing the same message sent in an uplink frame by a sending terminal associated with any subset, the method comprises: choosing, among the first gateways that transferred said message to the server, a gateway wherein a quality of reception of said frame is higher than or equal to a predefined quality threshold; and transmitting a request containing said response to the chosen gateway, said response being retransmitted by the chosen gateway to said sending terminal in a downlink frame.

According to a second aspect of the invention, the invention relates to a device of the server type included in a long-range wireless network and affording low energy consumption, wherein terminals communicate with the server by means of gateways in a set of gateways according to a communication technology meaning that, when the server receives a message from a terminal via a first gateway, it fixes an instant at which the gateway must relay a response to said message according to an instant of reception of said message by said first gateway, each gateway being associated with a set of terminals comprising at least one terminal using said gateway for communicating with the server. The device comprises: reception means for receiving a request coming from a first gateway containing a message sent in a frame, referred to as an uplink frame, by a terminal, referred to as a sending terminal; determination means for determining a second gateway different from the first gateway to be used for relaying a response to said message intended for the sending terminal, the second gateway being determined in a subset of gateways in the set of gateways comprising the first gateway and at least one second gateway, each gateway in the subset being capable of relaying to a terminal a response to a message transmitted in an uplink frame by said terminal received by any other gateway in said subset, the gateways in the subset having at least one terminal associated in common and being associated with the sending terminal; transmission means for transmitting a request containing said response to the second gateway, said response being retransmitted by the second gateway to the sending terminal in a frame referred to as a downlink frame at an instant indicated in the request, said instant being indicated in a time reference of the first gateway, the second gateway taking into account a clock difference between the first and second gateways for transmitting a downlink frame at said instant.

According to a third aspect of the invention, the invention relates to a system included in a long-range wireless network and affording low energy consumption, comprising a device of the server type according to the second aspect, a plurality of terminals and a plurality of gateways, each gateway in the subset being capable of relaying to a terminal a response to a message transmitted in an uplink frame by said terminal received by any other gateway in said subset, the gateways in the subset having at least one associated terminal in common.

According to a fourth aspect of the invention, the invention relates to a computer program comprising instructions for implementing, by a device, the method according to the first aspect, when said program is executed by a processor of said device.

According to a fifth aspect of the invention, the invention relates to storage means storing a computer program comprising instructions for implementing, by a device, the method according to the first aspect, when said program is executed by a processor of said device.

The features of the invention mentioned above, as well as others, will emerge more clearly from the reading of the following description of an example embodiment, said description being made in relation to the accompanying drawings, among which:

The invention is described hereinafter in a LoRa network context. The invention does however apply in other contexts for all types of long-range wireless network affording low energy consumption wherein terminals communicate with a central server via half-duplex gateways.

Figure 1:
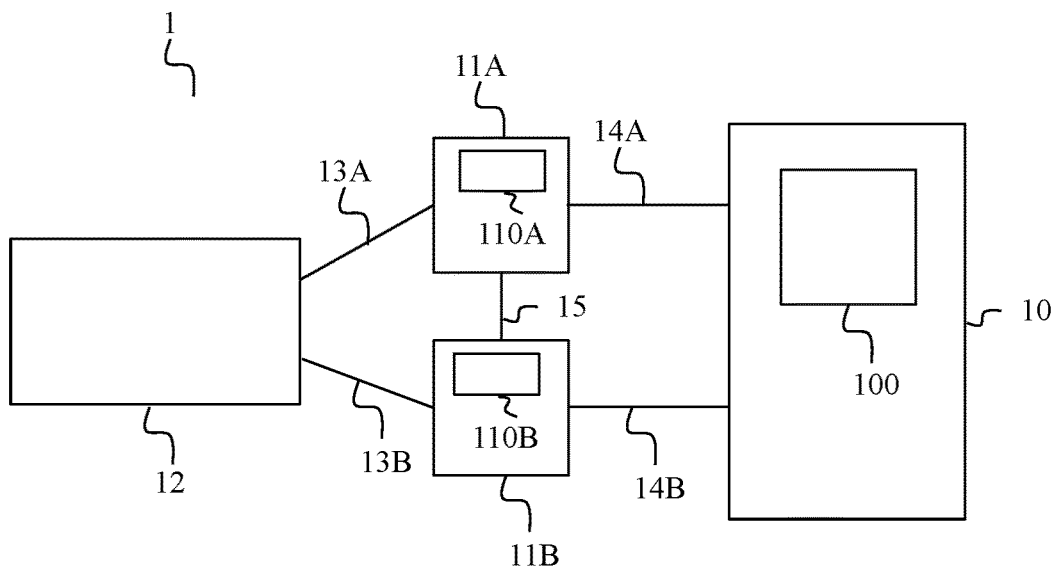
FIG. 1 illustrates schematically a LoRa network wherein the invention is implemented.

FIG. 1 illustrates schematically an example of a LoRa network 1 wherein the invention is implemented.

In the example in FIG. 1, the LoRa network 1 comprises a server 10, a set of gateways comprising at least two gateways (in FIG. 1 only two gateways 11A and 11B are shown) and at least one terminal (in FIG. 1 only one terminal 12 is shown). Each gateway communicates with the server 10 by means of a cable or wireless communication link. For example, the gateway 11A (and respectively the gateway 11B) communicates with the server 10 by means of a cable or wireless link 14A (and respectively 14B). In addition, each communication between a gateway and a terminal uses a wireless communication link. For example, the gateway 11A (and respectively the gateway 11B) communicates with the terminal 12 by means of a wireless communication link 13A (and respectively 13B).

The server 10 comprises a processing module 100. Each gateway comprises a processing module. For example, the gateway 11A (and respectively 11B) comprises a processing module 110A (and respectively 110B).

In one embodiment, some gateways can communicate with each other. To do this, each gateway wishing to communicate with another gateway uses a functionality that is to enable a gateway to be temporarily taken to be a terminal. For example, the gateways 11A and 11B may communicate with each other by means of a wireless communication link 15.

It should be noted that, in the LoRa network 1, the communications between the terminals and the gateway and the communications between gateways use frames compatible with the LoRaWAN protocol. The document LoRaWAN 1.1 ("Draft LoRaWAN 1.1") of August 2015 defines the communications between the terminals and the gateways of a LoRa network.

Figure 2A:
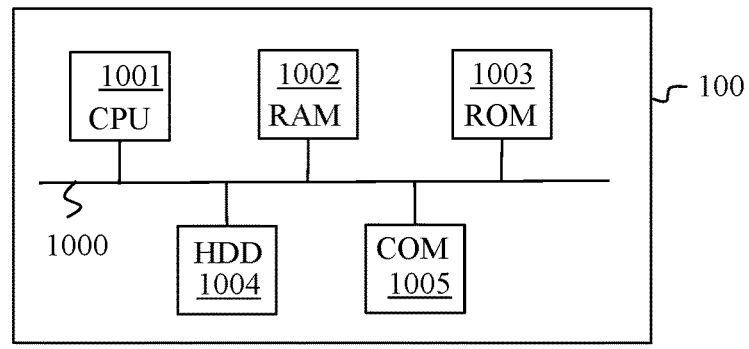
FIG. 2A illustrates schematically a processing module included in a server.

FIG. 2A illustrates schematically an example of hardware architecture of the processing module 100 included in the centralised server 10.

According to the example of hardware architecture shown in FIG. 2A, the processing module 100 then comprises, connected by a communication bus 1000: a processor or CPU (central processing unit) 1001; a random access memory RAM 1002; a read only memory ROM 1003; a storage unit such as a hard disk or a storage medium reader, such as an SD (Secure Digital) card reader 1004; at least one communication interface 1005 enabling the processing module 100 to communicate with other modules or devices. For example, the communication interface 1005 enables the processing module 100 to communicate with the gateways in the LoRa network 1 such as the gateways 11A and 11B or with remote servers belonging to the cloud.

The processor 1001 is capable of executing instructions loaded in the RAM 1002 from the ROM 1003, from an external memory (not shown), from a storage medium (such as an SD card), or from a communication network. When the server 10 is powered up, the processor 1001 is capable of reading instructions from the RAM 1002 and executing them. In one embodiment, these instructions form a computer program causing the complete or partial implementation, by the processor 1001, of the methods described below in relation to FIGS. 3, 4, 5A, 5B and 6.

Figure 2B:
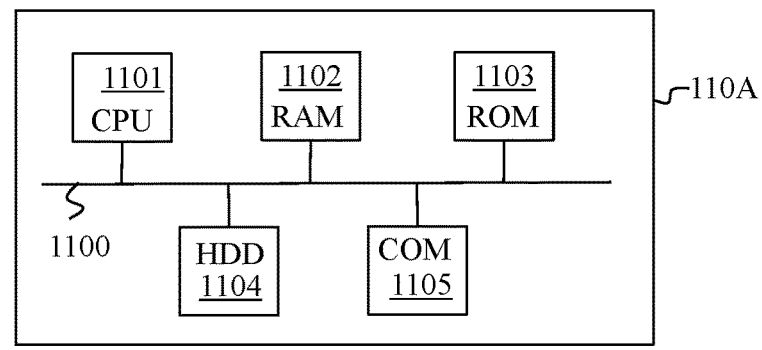
FIG. 2B illustrates schematically a processing module included in a gateway.

FIG. 2B illustrates schematically an example of hardware architecture of the processing module 110A included in the LoRa gateway 11A. The processing module 110B is identical.

According to the example of hardware architecture shown in FIG. 2B, the processing module 110A then comprises, connected by a communication bus 1100: a processor or CPU 1101; a random access memory RAM 1102; a read only memory ROM 1103; a storage unit such as a hard disk or a storage medium reader, such as an SD card reader 1104; at least one communication interface 1105 enabling the processing module 110A to communicate with other modules or devices. For example, the communication interface 1105 enables the processing module 110A to communicate with the server 10, with other gateways in the LoRa network 1 such as the gateway 11B or with terminals of the LoRa network 1 such as the terminal 12. In one embodiment, the processing module 110A further comprises a counting module able to provide a counting value $CPRT_i$ coded in 32 bits and incremented by one unit at each microsecond, i being an identifier of the processing module (i.e. i=110A for the counting module of the processing module 110A).

The processor 1101 is capable of executing instructions loaded in the RAM 1002 from the ROM 1003, from an external memory (not shown), from a storage medium (such as an SD card), or from a communication network. When the gateway 11A is powered up, the processor 1101 is capable of reading instructions from the RAM 1102 and executing them. In one embodiment, these instructions form a computer program causing the complete or partial implementation, by the processor 1101, of the methods described below in relation to FIGS. 3 and 4.

The methods described in relation to FIGS. 3, 4, 5A, 5B and 6 can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 3:
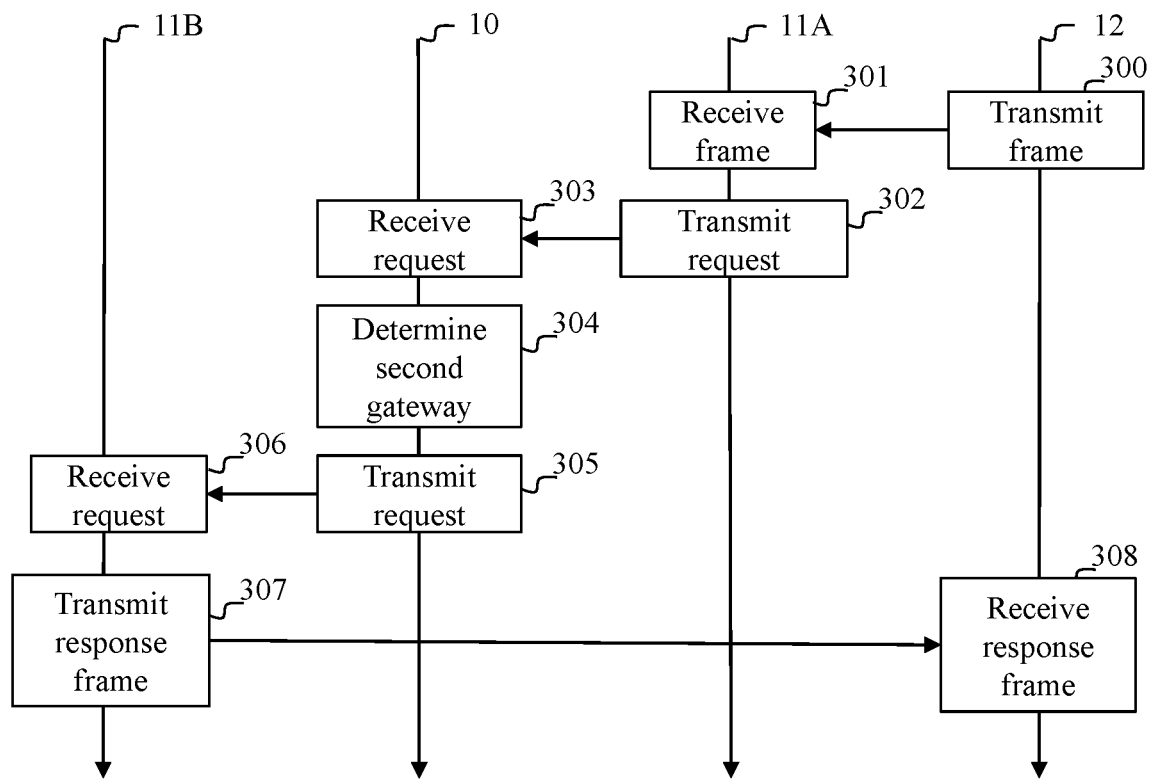
FIG. 3 illustrates schematically a communication method according to the invention.

FIG. 3 illustrates schematically a communication method according to the invention.

In a step 300, the terminal 12 sends a frame in accordance with the LoRaWAN protocol to the server 10. This frame, referred to as an uplink frame, is transmitted in broadcast mode so that each gateway within range of the terminal 12 receives this uplink frame. In the example of the LoRa network 1, it is supposed that the gateway 11A, referred to as a UL (uplink) gateway, receives each uplink frame transmitted by the terminal 12.

In a step 301, the processing module 110A of the gateway 11A therefore receives the uplink frame.

When a gateway in a LoRa network receives an uplink frame containing a message intended for a server, it decodes it and inserts the message contained in this uplink frame in an HTTP request, referred to as an uplink HTTP request, and then transmits this uplink HTTP request to the server of the LoRa network in unicast mode. In a step 302, the processing module 110A decodes and inserts the message contained in the uplink frame in an uplink HTTP request, and then transmits this uplink HTTP request to the server 10 in unicast mode. Furthermore, the request comprises information representing an instant of reception of the uplink frame by the gateway 11A. This information representing the instant of reception of the uplink frame is supplied to the processing module 110A by its counting module. This information representing the instant of reception of the uplink frame has therefore been measured in a time reference frame of the gateway 11A.

In a step 303, the processing module 100 of the server 10 receives the uplink HTTP request containing the message sent in the uplink frame by the terminal 12.

In a step 304, the processing module 100 determines a second gateway, referred to as a DL (downlink) gateway different from the gateway 11A (i.e. a UL gateway) to be used for relaying a response to the message contained in the uplink frame intended for the terminal 12. All the gateways in the LoRa network 1 are composed of a plurality of subsets of gateways. Each subset of gateways comprises gateways capable of relaying to a terminal a response to a message contained in an uplink frame, transmitted by said terminal, received by any other gateway in said subset. Each gateway in a subset may alternatively be a UL gateway or a DL gateway. Each gateway in a subset that has received an uplink frame is considered to be a UL gateway. Each gateway in a subset relaying a response to a message contained in an uplink frame received by another gateway in the subset, that is to say relaying a response to a message contained in an uplink frame on behalf of another gateway in the subset, is considered to be a DL gateway. Each subset therefore comprises at least one first and one second gateway. The first gateway may alternatively be a UL gateway or a DL gateway. The second gateway may be a DL gateway when the first gateway is a UL gateway, or a UL gateway when the first gateway is a DL gateway. The gateways in a subset have at least one terminal associated in common with each other. A gateway is considered to be associated with a terminal when it has received uplink frames coming from said terminal during a recent period. Moreover, each gateway in a subset is associated with at least one terminal that sent the uplink frame received by a UL gateway in the subset. In the step 304, the DL gateway is therefore determined in a subset comprising the gateway 11A and wherein each gateway is at least associated with the terminal 12. In the example described in relation to FIG. 3, the DL gateway determined is the gateway 11B. It should be noted that, although the uplink frame was transmitted in broadcast mode, the gateway 11B has not necessarily received this frame. We describe hereinafter in relation to FIGS. 5A and 5B two examples of procedures for creating subsets of gateways from the set of gateways in the LoRa network 1. It should be noted that, in the invention, it is the server 10 or a remote server in the cloud at the request of the server 10 that holds the characteristics of each subset. The server 10 (or remote server in the cloud under the control of the server 10) has either defined these subsets or obtained these subsets during a configuration of the LoRa network 1 by an operator. These characteristics comprise an identifier for each gateway belonging to said subset and an identifier for each terminal associated in common between all the gateways in said subset. The server 10 transmits the characteristics of each subset to each gateway belonging to said subset whenever said subset is defined or updated.

In a step 305, the processing module 100 transmits an HTTP request containing said response to the gateway 11B. This request further comprises information representing a required instant of transmission of said downlink frame corresponding to said request by the gateway 11B. This instant of transmission is calculated by the processing module 100 with respect to the information representing the instant of reception of the uplink frame by the gateway 11A. This calculation consists of adding a predefined period D to said instant of reception. For example, D=1 s. The instant of transmission is therefore calculated with respect to a time reference of the gateway 11A (i.e. of the UL gateway).

In a step 306, the processing module 110B of the gateway 11B receives the HTTP request containing said response.

In a step 307, the processing module 110B generates a downlink frame containing the response and transmits it in unicast mode to the terminal 12 at an instant corresponding to the information representing the required instant of transmission. As described above, the required instant of transmission was calculated with respect to the time reference of the gateway 11A. However, the gateway 11B does not function with the same time reference. This is because the time reference of the gateway 11B is given by the counting module of the processing module 110B which, although identical to the counting module of the processing module 110A, is generally offset with respect to the counting module of the processing module 110A. Moreover, even if the two counting modules had been synchronised at one moment, they could each suffer different drifts over time. In order to compensate for this offset, the processing module 110B takes into account a clock difference Δ between the gateway 11A and the gateway 11B. This clock difference Δ is obtained by the processing module 110B by regularly implementing a synchronisation procedure described below in relation to FIG. 4.

In a step 308, the terminal 12 receives the downlink frame containing the response to the message contained in the uplink frame.

In one embodiment, in the step 304, if the subset of gateways in which the gateway 11B (i.e. the DL gateway) was determined comprises a plurality of gateways liable to become a DL gateway on behalf of the gateway 11A (i.e. the UL gateway), the processing module 100 determines the DL gateway among the gateways in the plurality randomly.

In one embodiment, during the step 304, if the subset of gateways in which the gateway 11B was determined comprises a plurality of gateways liable to become a DL gateway on behalf of the gateway 11A, the processing module 100 determines the DL gateway among a number n of gateways in the plurality offering the best quality of communication with the terminal 12 randomly. For example, if the subset comprises a number m of gateways, m being equal to 100, n=10.

Figure 4:
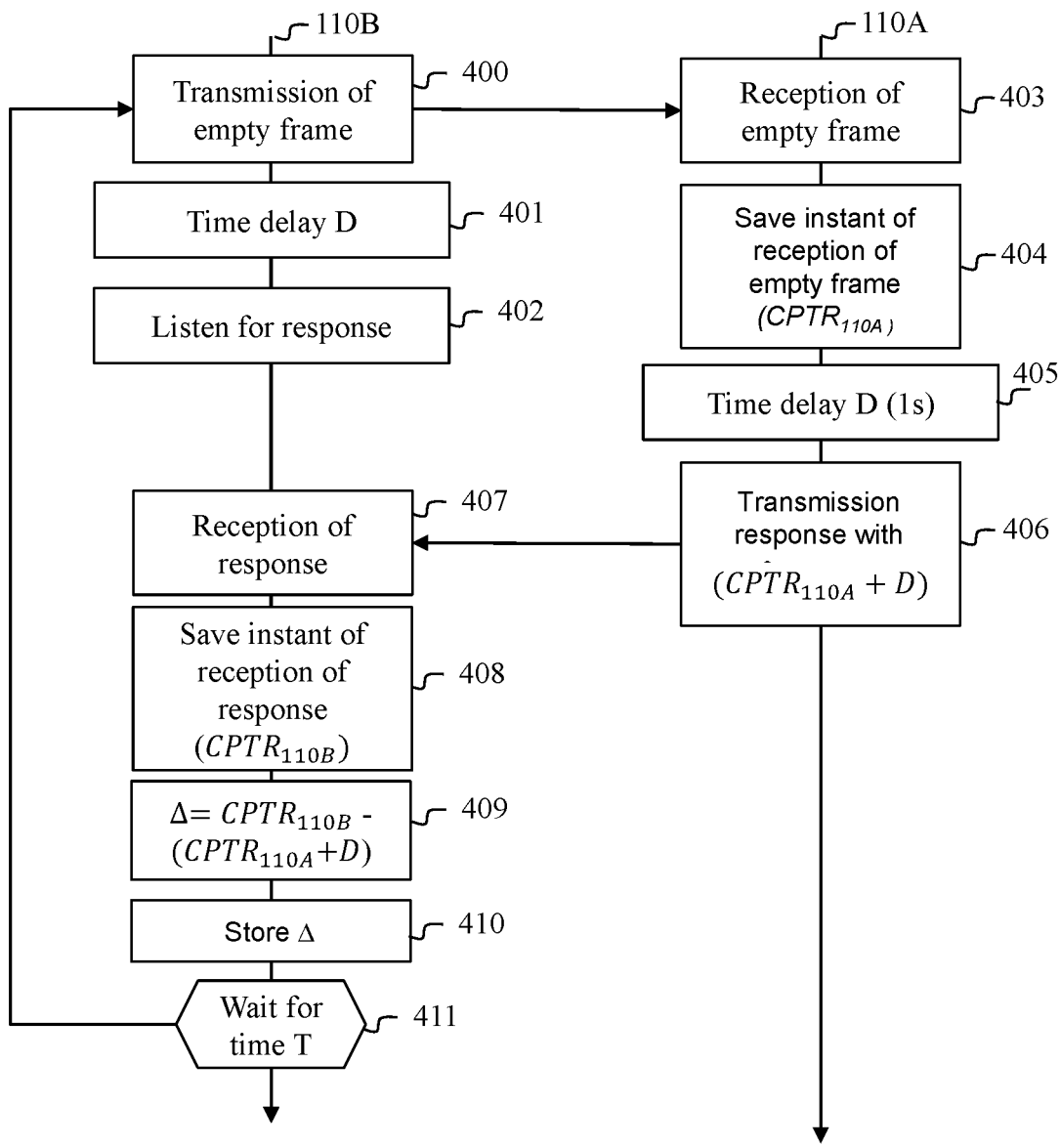
FIG. 4 illustrates schematically a synchronisation procedure according to the invention.

FIG. 4 illustrates schematically a synchronisation procedure according to the invention.

The synchronisation procedure is performed, in each subset, for each possible pair of gateways included in said subset. The procedure of synchronisation between two gateways in a pair is unidirectional. This is because, supposing that one of the two gateways in the pair, referred to as the initiating gateway, is the one that initiated the synchronisation procedure, the synchronisation procedure enables the initiating gateway to know the clock difference Δ existing between the two gateways in the pair. The other gateway in the pair, referred to as the collaborating gateway, which did not initiate the synchronisation procedure, does not know the clock difference Δ at the end of the performance of the synchronisation procedure. It is therefore necessary to execute the synchronisation procedure twice so that the two gateways in a pair know the clock difference Δ, each gateway in a pair alternately becoming initiator and collaborator. This procedure is performed for example at predefined regular intervals of duration T In one embodiment T=10 s.

In FIG. 4, the synchronisation procedure is performed between the gateways 11A and 11B, the gateway 11B being the one that initiates said procedure. In this example therefore, only the gateway 11B knows the clock difference Δ at the end of the performance of the synchronisation procedure.

In a step 400, the processing module 110B transmits an uplink frame in broadcast mode. To do this, the gateway 11B behaves as a terminal called TERM_11B. The uplink frame is considered to be an empty frame since it does not contain any payload but only header data in accordance with the LoRaWAN protocol, including an address addr_TERM_11B of the terminal TERM_11B.

In a step 401, following this transmission, the processing module 110B waits for a period D. In one embodiment D=1 s.

At the end of the period D, the processing module 110B listens out for a response to its empty uplink frame in a step 402.

In a step 403, the processing module 110A of the gateway 11A receives the empty uplink frame from the gateway 11B. The processing module 110A recognises the terminal TERM_11B (and therefore the gateway 11B) by means of the address addr_TERM_11B contained in the empty uplink frame. This is because the address addr_TERM_11B is an identifier of the gateway 11B contained in the characteristics of the subset comprising the gateway 11A transmitted by the server 10 to all the gateways included in this subset.

In a step 404, the processing module 110A saves a current value $CPRT_{110A}$ of its counting module. The current value $CPRT_{110A}$ is information representing an instant of reception by the gateway 11A of the empty uplink frame coming from the terminal TERM_11B (i.e. from the gateway 11B).

In a step 405, following the reception of the empty uplink frame, the processing module 110B waits during the period D.

At the end of the period D, the processing module 110A transmits a response to the empty uplink frame in a step 406. This response is transmitted in the form of a downlink frame in unicast mode intended for the gateway 11B. This response comprises the information representing the instant of reception by the gateway 11A of the empty uplink frame to which the period D was added, that is to say $CPRT_{110A}+D$.

In a step 407, the processing module 110B receives the downlink frame containing the response.

In a step 408, the processing module 110B saves a current value $CPRT_{110B}$ of its counting module. The current value $CPRT_{110B}$ is information representing an instant of reception by the gateway 11B of the downlink frame coming from the gateway 11A.

In a step 409, the processing module 110B calculates a clock difference Δ between the clocks of the gateways 11A and 11B:

$$\Delta = CPRT_{110B} - (CPRT_{110A} + D)$$

In a step 410, the processing module 110B stores the clock difference Δ. The clock difference Δ is used during the step 307.

In a step 411, the processing module 110B waits during the time of the predefined regular interval T and then returns to the step 400 in order to update the clock difference Δ.

In one embodiment, the duration of the interval between two initiations of the synchronisation procedure is not predefined but adaptive. For example, this interval duration, denoted $T_{adapt}$, depends on a change in the differences Δ over time. If the processing module of the initiating gateway (here the gateway 110B) finds that an absolute value of the clock difference |Δ| increases then the duration of the interval $T_{adapt}$ is reduced. If the absolute value of the clock difference |Δ| decreases, then the duration of the interval $T_{adapt}$ is increased. For example, if $L_{curr}$ is the last difference calculated and $\Delta_{pre}$ is the previous difference:

$$T_{adapt} = T_{adapt}\left(1 - \frac{|\Delta_{curr}| - |\Delta_{pre}|}{|\Delta_{pre}|}\right)$$

In the example in FIG. 4, we show how the gateway 11B obtains the clock difference Δ between the gateway 11A and the gateway 11B. For the gateway 11A to obtain the clock difference Δ between the gateway 11A and the gateway 11B, it is necessary for it to initiate the synchronisation procedure and therefore for it to execute the steps 400, 401, 402, 407, 408, 409, 410 and 411, the gateway 11B executing the steps 403, 404, 405 and 406.

In one embodiment, each gateway in a subset implements, by means of its processing module, a software module (i.e. an application) specific for each other gateway in said subset with which it forms a pair. For each other gateway, this software module manages the reception of the empty uplink frame (step 403), each processing applied following this reception (step 404 and 405) and the transmission (step 406) of the downlink frame containing the information representing the instant of reception of the empty uplink frame to which the period D was added.

As seen above, the invention relies on a use of subsets of gateways. Each subset of gateways comprises gateways capable of relaying to a terminal a response to a message contained in an uplink frame, transmitted by said terminal, received by any other gateway in said subset.

In one embodiment, the subsets are obtained during a configuration of the LoRa network 1 by an operator. During this configuration, the operator defines the subsets. For example, the operator forms subsets from gateways where he knows that they can replace each other in order to relay in a downlink frame a response to a message received in an uplink frame by one of them. For this purpose, the operator can go by a geographical position of each gateway. Thus a subset associated with a first gateway can be formed from gateways situated within a radius of R from the first gateway (for example R=10 kilometres). In this embodiment the starting point is the principle that a terminal that is capable of transmitting an uplink frame to the first gateway is capable of receiving a downlink frame from a second gateway situated within a radius of R kilometres around the first gateway.

This first embodiment, in addition to the fact that it is tedious to implement if the LoRa network comprises a large number of gateways and terminals, is not adaptive. It does not in fact take into account any malfunctioning of a gateway or a change in environment of a gateway (for example a construction of a building in the vicinity of the second gateway that would prevent communications between the first and second gateways or between the second gateway and the terminal that transmitted the uplink frame). In addition, each insertion of a new gateway in the LoRa network 1 requires action by the operator in order to modify the characteristics of at least some subsets. This embodiment can however be used at the start-up of the LoRa network 1 when the server 10 has no information on the gateways actually associated with each terminal.

Figure 5A:
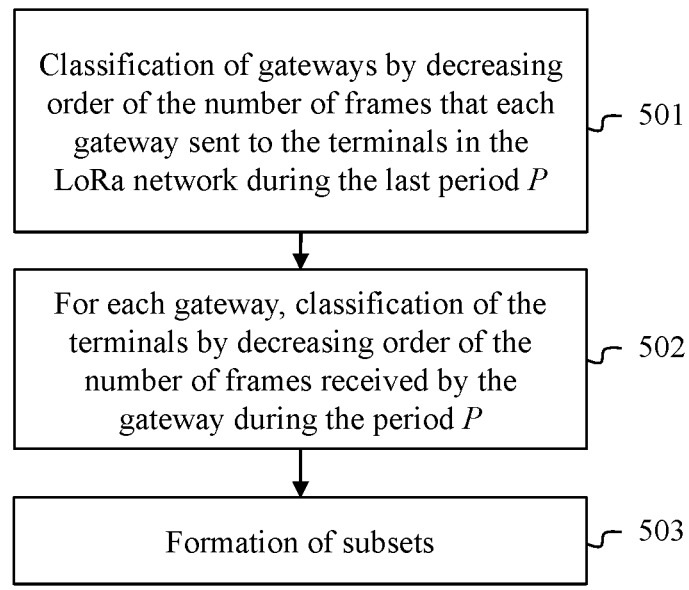
FIG. 5A illustrates schematically a first example of an adaptive procedure for forming subsets of gateways according to the invention.
Figure 5B:
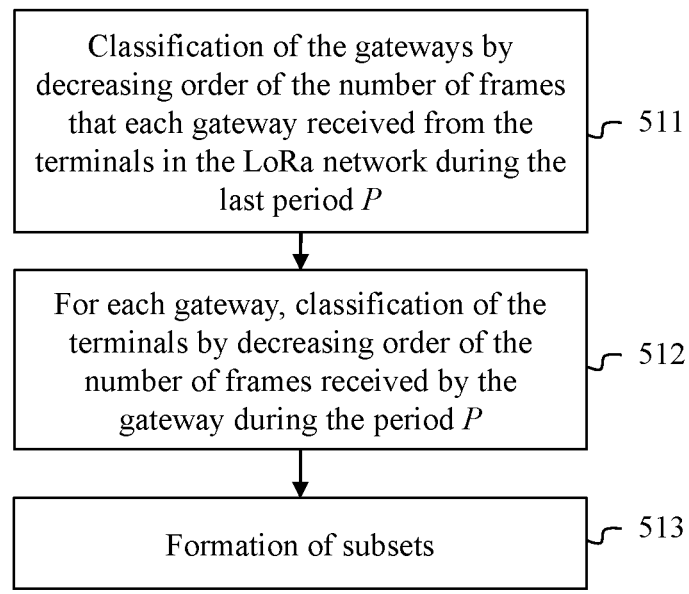
FIG. 5B illustrates schematically a second example of an adaptive procedure for forming subsets of gateways according to the invention.

FIGS. 5A and 5B illustrate schematically a first example and a second example of an adaptive procedure for forming subsets of gateways according to the invention.

Each adaptive procedure for forming subsets of gateways is executed periodically with a period P by the server 10 or by a remote server in the cloud under the control of the server 10. P is for example a period of two hours.

The first and second examples of an adaptive procedure for forming subsets of gateways are adapted to different contexts.

The context of the example in FIG. 5A is that of a LoRa network in which, the gateways in the LoRa network being able to transmit over the same channels, said gateways can transmit downlink frames to and receive uplink frames from each terminal in the LoRa network that is within their range.

The context of the example in FIG. 5B is that of a LoRa network wherein the gateways of the LoRa network cannot receive uplink frames from each terminal in the LoRa network that is within their range. In this context, it is considered that the gateways use a dynamic reception channel that runs through the entire frequency band allocated to LoRa so as to be able to receive terminals that they could not receive otherwise.

For executing these procedures of forming subsets of gateways, the server 10 (or a remote server in the cloud under the control of the server 10) uses information on the requests that it receives from the gateways in the LoRa network 1 or that it sends to the gateways in the LoRa network 1. This information comprises, for each request:

time of transmission or of reception of the request;
type of the request: uplink or downlink;
identifier of the terminal to which the request relates;
identifier of the gateway to which the request relates.

Hereinafter, we describe the adaptive procedures of formation of subsets of gateways when they are executed by the processing module 100 of the server 10. These procedures could just as well be executed by an equivalent processing module of a remote server in the cloud that would then provide a result of execution of the procedures to the server 10.

It is supposed hereinafter that the LoRa network comprises $N_p$ gateways.

With reference to FIG. 5A, in a step 501, the processing module 100 classifies the gateways in the LoRa network 1 by decreasing order of the number of downlink frames that each gateway has sent to the terminals in the LoRa network 1 during the last period P.

In one embodiment, the processing module 100 classifies only the gateways that have sent at least a predetermined number $\lambda$ of downlink frames during the last period P. In one embodiment $\lambda=100$. The other gateways are not considered in the remainder of the procedure. There then remain only $N'_p \leq N_p$ gateways to be considered, each denoted $GW_i$ hereinafter, where i is an index varying from 1 to $N'_p$.

In a step 502, the processing module 100 runs through the gateways $GW_i$ by increasing order of the index i. For each gateway $GW_i$, the processing module 100 classifies each terminal associated with the gateway $GW_i$ by decreasing order of the number of uplink frames received from said terminal by said gateway $GW_i$ during the last period P. A set of terminals classified $GT_i$ comprising $M_i$ terminals associated with the gateway $GW_i$ is then obtained for the gateway $GW_i$.

In a step 503, the processing module 100 once again runs through the gateways $GW_i$ by increasing order of the index i but this time in order to form the subsets.

Figure 6:
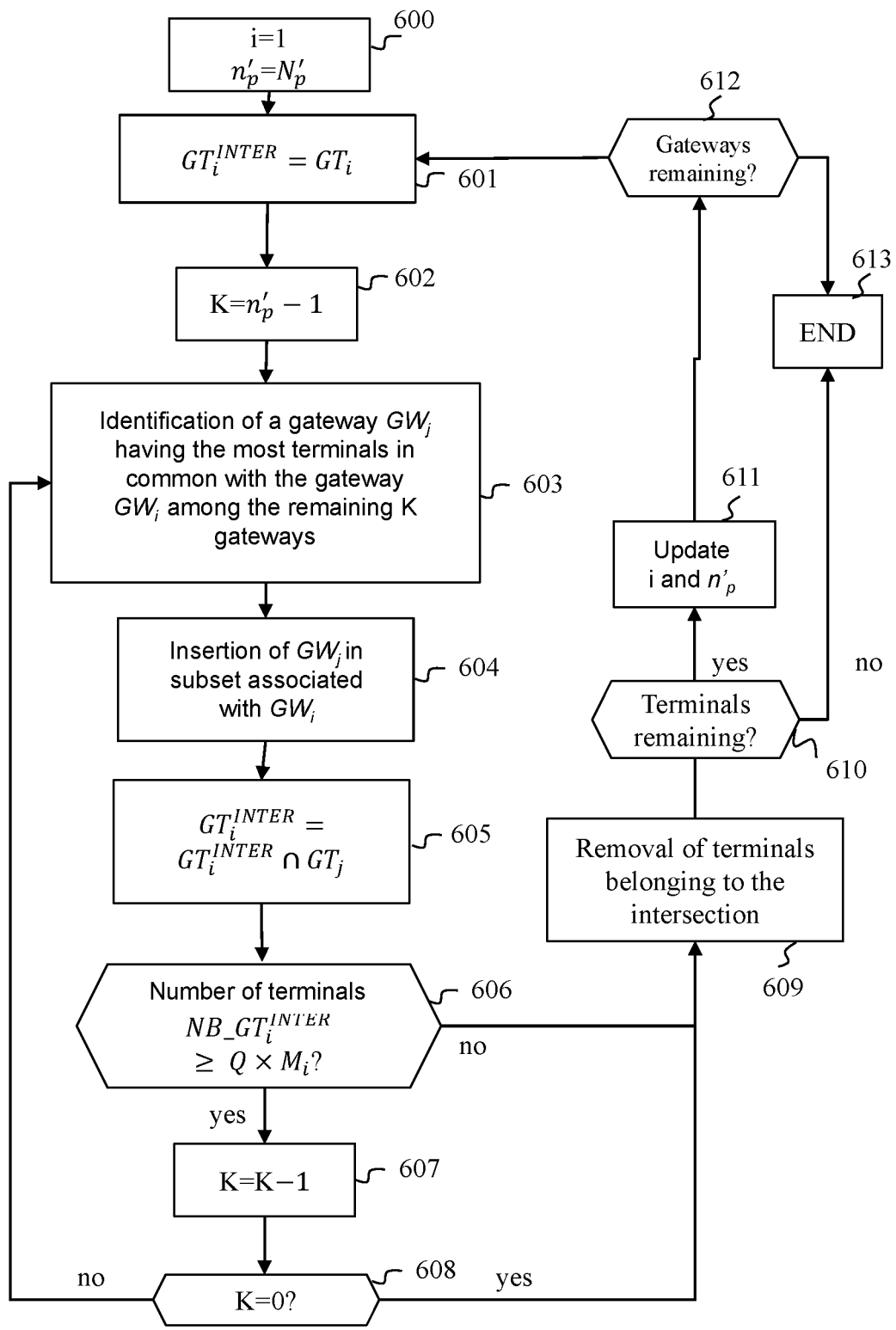
FIG. 6 illustrates schematically in detail the formation of the subsets of gateways.

FIG. 6 illustrates schematically in detail the formation of the subsets corresponding to the step 503.

In a step 600, the processing module 100 initialises a variable i to 1. The variable i makes it possible to run through the gateways $GW_i$. A gateway $GW_i$ is a gateway from which the processing module 100 forms a subset, the gateway $GW_i$ belonging to this subset. During the step 600, the processing module also initialises a variable $n'_p$ to the value of the number of gateways to be considered $N'_p$.

In a step 601, the processing module 100 initialises a set of terminals $GT_i^{INTER}$ to the set of terminals $GT_i$ associated with the gateway $GW_i$.

In a step 602, the processing module 100 initialises a variable K to the number of gateways able to be considered for forming the subset from the gateway $GW_i$. The variable K is therefore initialised to $n'_p-1$ since the gateway $GW_i$ is removed from the set of gateways that can be considered since, by definition, it forms part of a subset in the process of being formed.

In a step 603, the processing module 100 identifies, among the K remaining gateways, a gateway $GW_j$ having the most terminals in common with the gateway $GW_i$.

When the gateway $GW_j$ is found, the processing module 100, in a step 604, inserts the gateway $GW_j$ in the subset formed from the gateway $GW_i$. In other words, the processing module adds an identifier of the gateway $GW_j$ to a set of identifiers representing the subset formed from the gateway $GW_i$, this subset comprising an identifier of the gateway $GW_i$.

In a step 605, the processing module 100 reinitialises the set of terminals $GT_i^{INTER}$ as the intersection between the current set of terminals $GT_i^{INTER}$ and the set of terminals $GT_j$ associated with the gateway $GW_j$:

$$G_i^{INTER} = GT_i^{INTER} \cap GT_j$$

In a step 606 the processing module 100 checks whether the number of terminals $NB\_GT_i^{INTER}$ in the set of terminals $GT_i^{INTER}$ is greater than or equal to a predefined percentage Q of the number $M_i$ of terminals in the set of terminals $GW_i$. In one embodiment Q=25%.

If $NB\_GT_i^{INTER} \geq Q \times M_i$, the processing module 100 continues with a step 607. Otherwise the processing module continues with a step 609.

In the step 607, the processing module decrements the variable K by one unit in order to pass to another gateway $GW_j$ to be inserted in the subset of gateways formed from the gateway $GW_i$.

If in a step 608 the variable K is equal to zero, the processing module performs the step 609. Otherwise the processing module returns to the step 603.

In the step 609, the processing module 100 eliminates the terminals belonging to the set of terminals $GT_i^{INTER}$ from all the sets of terminals $GT_i$. In this way, the same terminal cannot be associated with a plurality of subsets.

During a step 610, the processing module 100 checks that, following the elimination of the terminals belonging to the set of terminals $GT_i^{INTER}$ terminals remain in at least two sets $GT_i$. If there no longer remain any sets $GT_i$ comprising terminals, this means that all the terminals have been associated with a subset. If there remains only one set $GT_i$ comprising terminals, this means that it will never be possible to associate said terminals with a subset. In one embodiment, for these terminals that are not associated with a subset, the behaviour of a conventional LoRa network applies. In these two cases, if there no longer remains any set $GT_i$ comprising terminals or if only one set $GT_i$ remains, the processing module 100 ends the algorithm in FIG. 6 in the step 613 and therefore ends the adaptive procedure of forming subsets of gateways in FIG. 5A.

Otherwise, in a step 611, the processing module 100 updates the variables i and $n'_p$. In one embodiment, a gateway may appear in a plurality of subsets. In this embodiment, in the step 610, the processing module 100 increments the variable i by one unit in order to pass to another gateway $GW_i$ and the variable $n'_p$ remains unchanged.

The step 611 is followed by a step 612 during which the processing module 100 checks whether all the gateways from which a subset can be formed have been considered. In the embodiment where a gateway may appear in a plurality of subsets, the processing module 100 checks whether the variable i is less than $N'_p$. If such is the case, the processing module 100 returns to the step 601. Otherwise the processing module 100 ends the algorithm in FIG. 6 in a step 613 and therefore ends the adaptive procedure of forming subsets of gateways of FIG. 5A.

It should be noted that, at the end of the algorithm in FIG. 6, each of the $N'_p$ gateways is included in a subset, each gateway in a subset being associated with each terminal belonging to the intersection $GT_i^{INTER}$ of the sets of terminals $GT_i$ associated with each gateway in said subset.

According to the algorithm in FIG. 6, a gateway may appear in a plurality of subsets.

In one embodiment, when a gateway $GW_j$ has been inserted in a subset formed from a gateway $GW_i$ during an execution of the step 604, this gateway $GW_j$ can no longer be inserted in a subset formed from any other gateways. In this embodiment, a gateway can therefore appear only in a single subset. In this embodiment, during the step 611, the variable i takes a value of an index of a gateway $GW_i$ that does not belong to a subset already formed. Moreover, the variable $n'_p$ takes a value corresponding to a number of gateways included in the $N'_p$ gateways not appearing in any subset already formed. During the step 612, the processing module 100 checks whether there remains at least two gateways not appearing in any subset already formed. If no gateway remains, this means that all the gateways have been inserted in a subset. If there exists only one gateway, this means that it is not possible to form a subset from the remaining gateway since at least two gateways are needed to form a subset. In this case, the processing module 100 ends the algorithm in FIG. 6 during the step 613 and therefore ends the adaptive procedure of forming subsets of gateways of FIG. 5A.

With reference now to FIG. 5B, in a step 511, the processing module 100 classifies the gateways of the LoRa network 1 by decreasing order of the number of uplink frames that each gateway has received from the terminals in the LoRa network 1 during the last period P.

In a similar manner to the procedure in FIG. 5A, in one embodiment the processing module 100 classifies only the gateways that have received at least a predetermined number A of uplink frames during the last period P. The other gateways are not considered in the remainder of the procedure. There then remain only $N''_p \le N_p$ gateways to be considered, denoted $GW_i$ hereinafter, where i is an index varying from 1 to $N''_p$.

The step 511 is followed by the steps 512 and 513 strictly identical to the steps 502 and 503. In one embodiment, each uplink HTTP request transmitted by a gateway $GW_i$ containing a message sent in an uplink frame by a terminal $TERM_k$ (k ranging from 0 to the number of terminals included in the LoRa network 1) further comprises a value $q_{i,k}$ representing a quality of reception of said uplink frame by said gateway $GW_i$. For each possible pair consisting of gateway $GW_i$ and terminal $TERM_k$ of the LoRa network 1, the processing module 100 stores a variable $Q_{i,k}$. The variable $Q_{i,k}$ is initialised by the processing module 100 to a value of a predefined quality threshold SQ at each start of a predefined period D. For example, the period D is dependent on the period P. In another embodiment, the period D is independent of the period P and is for example equal to 24 hours. At each reception of an uplink frame from a terminal $TERM_k$ by a gateway $GW_i$, the processing module 100 recovers the value $q_{i,k}$ contained in the uplink HTTP request and stores this value in the variable $Q_{i,k}$. In the variable $Q_{i,k}$, the processing module 100 therefore stores a value representing the quality of reception of the last uplink frame received by the gateway $GW_i$ of said terminal $TERM_k$. The processing module 100 therefore stores reception quality values $Q_{i,k}$ representing the last quality information known to pairs consisting of a gateway $GW_i$ and a terminal $TERM_k$.

In this embodiment, when at least one gateway $GW_i$ relays, in an uplink HTTP request, a message transmitted in an uplink frame by a terminal $TERM_k$ that is not associated with a subset, the processing module 100 chooses, among the gateways $GW_i$ that transferred said message, a gateway $GW_i$ where the quality $Q_{i,k}$ of reception of said frame is higher than or equal to the predefined quality threshold SQ. The processing module 100 can choose only among the gateways $GW_i$ that received the uplink frame for relaying a response to said message since the gateways $GW_i$ that have transferred an uplink HTTP request containing a message coming from a terminal $TERM_k$ that is not associated with any subset are not deemed to be synchronised. The choice is for example made randomly among the gateways $GW_i$ wherein the quality of reception of said frame is higher than or equal to the predefined quality threshold SQ. If no gateway $GW_i$ has a quality of reception higher than or equal to the predefined quality threshold SQ, the processing module 100 chooses the gateway that has the highest quality of reception.

In one embodiment, referred to as embodiment with counter, the processing module 100 associates a counter $CPTR_i$ with each gateway $GW_i$ in the LoRa network 1. The counter $CPTR_i$ makes it possible to count, for each gateway $GW_i$, the number of downlink frames transmitted by said gateway $GW_i$ in response to messages transmitted in uplink frames by the terminals $TERM_k$ (i.e. the number of times that a gateway $GW_i$ has been chosen to relay a response to a message transmitted in an uplink frame by a terminal $TERM_k$). In this embodiment, each counter $CPTR_i$ is reset to zero at each start of a period D. In this embodiment, when a gateway $GW_i$ has been chosen to relay a response to a message transmitted in an uplink frame by a terminal $TERM_k$ that is not associated with a subset or is associated with a subset, the counter $CPTR_i$ associated with said gateway $GW_i$ is incremented by one unit. The embodiment with counter makes it possible to better distribute the transmission load of the responses. This is because a gateway that has been little used for relaying responses to messages transmitted in uplink frames by terminals $TERM_k$, is favoured compared with another gateway more often used for relaying responses.

In a first variant of a procedure for choosing a gateway that is to relay a response to a message emanating from a terminal adapted to the embodiment with counter, in the step 304, if the subset of gateways $GW_i$ in which the gateway 11B (i.e. the DL gateway) was determined comprises a plurality of gateways $GW_i$ liable to become a DL gateway on behalf of the gateway 11A (i.e. of the UL gateway), the processing module 100 determines the DL gateway among the gateways $GW_i$ in the plurality using the values of counters $CPTR_i$ associated with each gateway $GW_i$ in the plurality. The processing module 100 thus chooses the gateway $GW_i$ associated with the lowest value of the counter $CPTR_i$. When the lowest counter value is shared by a plurality of gateways $GW_i$, the processing module 100 randomly chooses a gateway $GW_i$ among the gateways $GW_i$ associated with said counter value. The counter $CPTR_i$ of the gateway $GW_i$ chosen is then incremented by one unit.

Figure 7:
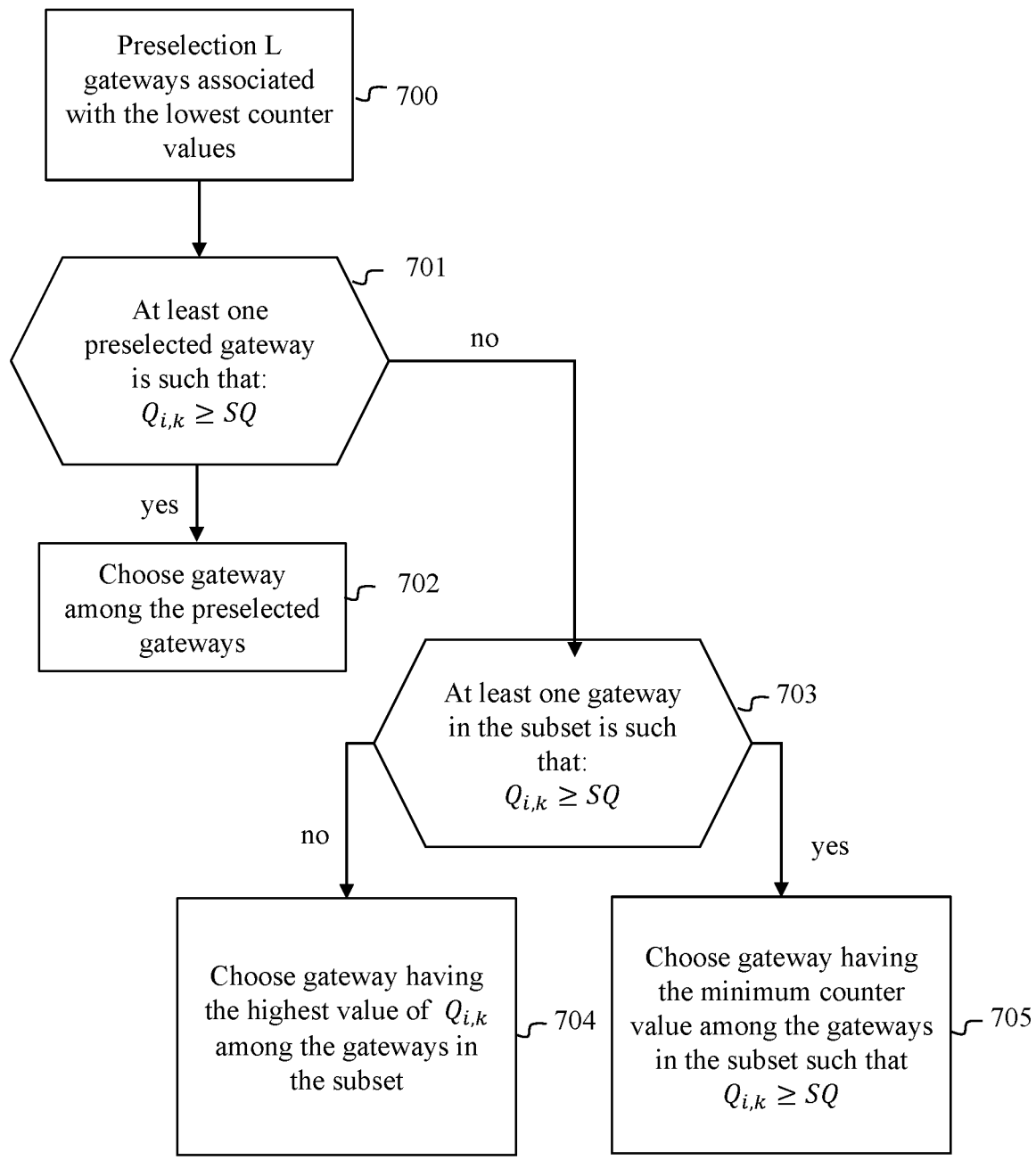
FIG. 7 illustrates schematically a procedure for choosing a gateway that is to relay a response to a message emanating from a terminal.

FIG. 7 illustrates schematically a second variant of a procedure for choosing a gateway that is to relay a response to a message emanating from a terminal adapted to the embodiment with counter. The method of choosing illustrated in FIG. 7 corresponds to a particular implementation of the step 304.

It is supposed there also that the subset of gateways wherein the DL gateway must be determined comprises a plurality of gateways liable to become a DL gateway on behalf of the UL gateway.

In a step 700, the processing module 100 preselects a number L of gateways $GW_i$. The L gateways $GW_i$ preselected are L gateways $GW_i$ of said subset associated with the lowest values of counters $CPTR_i$. In one embodiment L=5.

In a step 701, the processing module 100 checks whether at least one of the L gateways $GW_i$ preselected is associated with a reception quality value $Q_{i,k}$ for an uplink frame sent by the terminal 12 (which then fulfils the role of terminal $TERM_k$ that sent the uplink frame) higher than or equal to the predefined quality threshold SQ.

If a single preselected gateway $GW_i$ is associated with a reception quality value $Q_{i,k}$ higher than or equal to the predefined quality threshold SQ, in a step 702, the processing module 100 chooses this gateway for relaying a response to the message contained in the uplink frame sent by the terminal 12.

If a plurality of preselected gateways $GW_i$ are associated with a reception quality value $Q_{i,k}$ higher than or equal to the predefined quality threshold SQ, in the step 702 the processing module 100 randomly chooses one of these gateways $GW_i$ for relaying a response to the message contained in the uplink frame sent by the terminal 12.

In the step 702, the processing module 100 increments by one unit the value of the counter $CPTR_i$ of the gateway $GW_i$ chosen.

If each preselected gateway $GW_i$ is associated with a reception quality value $Q_{i,k}$ lower than the predefined quality threshold SQ, the processing module 100 passes to a step 703.

In the step 703, the processing module 100 determines whether at least one gateway in the subset is associated with a reception quality value $Q_{i,k}$ higher than or equal to the predefined quality threshold SQ. If such is the case, the processing module 100 passes to a step 705.

In the step 705, the processing module 100 chooses, among the gateways $GW_i$ of the subset, the gateway $GW_i$ associated with a reception quality value $Q_{i,k}$ higher than or equal to the predefined quality threshold SQ having the lowest counter value $CPTR_i$. If the lowest counter value $CPTR_i$ is shared by a plurality of gateways $GW_i$, the processing module 100 randomly chooses a gateway $GW_i$ among these gateways. In the step 705, the processing module 100 increments by one unit the value of the counter $CPTR_i$ of the gateway $GW_i$ chosen.

If each gateway in the subset is associated with a reception quality value $Q_{i,k}$ lower than the predefined quality threshold SQ, the processing module 100 performs a step 704. In the step 704, the processing module 100 chooses the gateway $GW_i$ associated with the highest value $Q_{i,k}$ among the gateways in the subset. If the highest value $Q_{i,k}$ is shared by a plurality of gateways $GW_i$, the processing module 100 randomly chooses a gateway $GW_i$ among these gateways. In the step 704, the processing module 100 increments by one unit the value of the counter $CPTR_i$ of the gateway $GW_i$ chosen.

The invention claimed is:

1. A communication method executed in a long-range wireless network and affording low energy consumption wherein terminals communicate with a server by means of gateways in a set of gateways according to a communication technology meaning that, when the server receives a message from a terminal via a first gateway, it fixes an instant at which a gateway must relay a response to said message according to an instant of reception of said message by said first gateway, each gateway being associated with a set of terminals comprising at least one terminal using said gateway for communicating with the server, wherein the method used by the server comprises:

receiving a request coming from a first gateway containing a message sent in a frame, referred to as an uplink frame, by a terminal, referred to as the sending terminal;

determining a second gateway different from the first gateway to be used for relaying a response to said message intended for the sending terminal, the second gateway being determined in a subset of gateways in the set of gateways comprising the first gateway and at least one second gateway, each gateway in the subset being capable of relaying to a terminal a response to a message transmitted in an uplink frame by said terminal received by any other gateway in said subset, the gateways in the subset having at least one terminal associated in common and being associated with the sending terminal, the second gateway being determined by executing a choice procedure comprising:

preselecting a predefined number of gateways associated with the lowest counter values among the counter values associated with the gateways in said subset representing a number of downlink frames transmitted by the gateways of said subset in response to messages transmitted in uplink frames by terminals;

choosing a gateway associated with a value representing a quality of communication with the sending terminal that is higher than or equal to a predefined quality threshold among the gateways in the predefined number of preselected gateways, the chosen gateway becoming the second gateway;

transmitting a request containing said response to the second gateway, said response being retransmitted by the second gateway to said sending terminal in a frame, referred to as a downlink frame, at an instant indicated in the request, said instant being indicated in a time reference of the first gateway, the second gateway taking into account a clock difference between the first and second gateways in order to transmit a downlink frame at said instant.

2. The method according to claim 1, wherein the communication technology is the LoRa technology and each frame exchanged between a gateway and a terminal is in accordance with the LoRaWAN protocol.

3. The method according to claim 1, wherein the set of gateways comprises a plurality of subsets of gateways, each subset being formed by an operator from gateways able to stand in for each other in order to relay a response in a downlink frame to a message received in an uplink frame by one of them or by an adaptive procedure of formation of the subsets performed periodically under the control of the server with a predefined period.

4. The method according to claim 3, wherein the server transmits, to each gateway included in a subset, characteristics of said subset comprising an identifier for each gateway included in said subset and an identifier for each terminal associated in common between the gateways in the subset.

5. The method according to claim 3, wherein the adaptive procedure of formation of the subsets comprises:

classifying the gateways in the set of gateways by decreasing order of the number of downlink frames that each gateway has sent during the last predefined period or by decreasing order of the number of uplink frames that each gateway has received during the last predefined period;

running through the gateways thus classified in their classification order and, for each gateway, classifying each terminal associated with said gateway by decreasing order of the number of uplink frames received from said terminal by said gateway during the last predefined period;

running through the gateways in the classification order thereof and, for each gateway, defining a subset of gateways from said gateway, said gateway being referred to as the base gateway, belonging to said subset, the definition of the subset comprising:

as long as a number of terminals in a first set of terminals associated with the subset of gateways being defined is higher than a predefined percentage of the number of terminals in a second set of terminals associated with the base gateway:
  identifying, among the gateways thus classified that have not yet been inserted in the subset, a gateway having the most terminals in common with the base gateway;
  inserting the gateway thus identified in the subset, and forming the first set of terminals as an intersection between the second set of terminals and each set of terminals associated with a gateway inserted in the subset;
  and eliminating each terminal included in the first set of terminals from the sets of terminals associated with the gateways thus classified.

6. The method according to claim 5, wherein, when the gateways are classified by decreasing order of the number of downlink frames that each gateway has sent during the last predefined period, only the gateways that have sent at least a predetermined number of downlink frames during the last predefined period are classified and, when the gateways are classified by decreasing order of the number of uplink frames that each gateway has received during the last predefined period, only the gateways that have received at least one predetermined number of uplink frames during the last predefined period are classified.

7. The method according to claim 5, wherein, when a gateway has been inserted in a subset formed from one base gateway, this gateway can no longer be inserted in a subset formed from all other base gateways.

8. The method according to claim 5, wherein the adaptive procedure of forming the subsets stops when all the classified gateways have been inserted in a subset or when all the terminals in the network are included in a set of terminals associated with a subset.

9. The method according to claim 1, wherein the clock difference existing between two gateways is determined by a synchronisation procedure, the synchronisation procedure being executed by one of the two gateways, referred to as an initiating gateway, in collaboration with the other gateway, referred to as a collaborating gateway, and comprising:
  transmitting an uplink frame intended for the collaborating gateway, the initiating gateway waiting during a predetermined period before listening out for a response to said uplink frame, said response being transmitted in a downlink frame by the collaborating gateway after a period equal to the predetermined period following a reception of said frame by the collaborating gateway, a first item of information representing an instant of reception of said request by the collaborating gateway to which the duration of the predetermined period being inserted in said response by the collaborating gateway has been added;
  receiving said response and obtaining a second item of information representing an instant of reception of said response by the second gateway; and
  calculating the clock difference between the initiating gateway and the collaborating gateway as a difference between the second and first items of information.

10. The method according to claim 9, wherein the synchronisation procedure is executed in each subset for each pair of possible gateways in said subset, each gateway in a pair of gateways being alternately initiating or collaborating, at predefined regular intervals or adaptive intervals with durations dependent on a change in the clock differences over time.

11. The method according to claim 1, wherein the second gateway is determined randomly in the subset of gateways comprising the first gateway or
  randomly among a predefined number of gateways in said subset offering a quality of communication with the sending terminal that is the highest among the gateways in said subset.

12. The method according to claim 1, wherein, when no gateway in the predefined number of gateways is associated with a value representing a quality of communication with the sending terminal higher than or equal to the predefined quality threshold, choosing a gateway in the subset associated with the lowest counter value among the values of counters associated with the gateways in said subset and associated with a value representing a quality of communication with the sending terminal higher than or equal to the predefined quality threshold; and,
  if no gateway in said subset is associated with a value representing a quality of communication with the sending terminal higher than or equal to the predefined quality threshold, choosing a gateway associated with the value representing a quality of communication with the sending terminal that is maximum among the values representing a quality of communication with the sending terminal that are associated with the gateways in said subset.

13. The method according to claim 1, wherein, when the server receives a plurality of requests each containing the same message sent in an uplink frame by a sending terminal associated with any subset, the method comprises:
  choosing, among the first gateways that transferred said message to the server, a gateway wherein a quality of reception of said frame is higher than or equal to a predefined quality threshold; and
  transmitting a request containing said response to the chosen gateway, said response being retransmitted by the chosen gateway to said sending terminal in a downlink frame.

14. A computer program, wherein it comprises instructions for implementing, by a device, the method according to claim 1 when said program is executed by a processor of said device.

15. A non-transitory storage medium, that store a computer program comprising instructions for implementing, by a device, the method according to claim 1 when said program is executed by a processor of said device.

16. A device of the server type included in a long-range wireless network and affording low energy consumption, wherein terminals communicate with the server by means of gateways in a set of gateways according to a communication technology meaning that, when the server receives a message from a terminal via a first gateway, it fixes an instant at which the gateway must relay a response to said message according to an instant of reception of said message by said first gateway, each gateway being associated with a set of terminals comprising at least one terminal using said gateway for communicating with the server, wherein the device comprises electronic circuitry configured to:
  receive a request coming from a first gateway containing a message sent in a frame, referred to as an uplink frame, by a terminal, referred to as a sending terminal;
  determine a second gateway different from the first gateway to be used for relaying a response to said message intended for the sending terminal, the second gateway being determined in a subset of gateways in the set of gateways comprising the first gateway and at least one second gateway, each gateway in the subset being capable of relaying to a terminal a response to a message transmitted in an uplink frame by said terminal received by any other gateway in said subset, the gateways in the subset having at least one terminal associated in common and being associated with the sending terminal; the second gateway being determined by executing a choice procedure comprising:

preselect a predefined number of gateways associated with the lowest counter values among the counter values associated with the gateways in said subset representing a number of downlink frames transmitted by the gateways of said subset in response to messages transmitted in uplink frames by terminals;

choose a gateway associated with a value representing a quality of communication with the sending terminal that is higher than or equal to a predefined quality threshold among the gateways in the predefined number of preselected gateways, the chosen gateway becoming the second gateway;

transmit a request containing said response to the second gateway, said response being retransmitted by the second gateway to the sending terminal in a frame referred to as a downlink frame at an instant indicated in the request, said instant being indicated in a time reference of the first gateway, the second gateway taking into account a clock difference between the first and second gateways for transmitting a downlink frame at said instant.

17. A system included in a long-range wireless network and affording low energy consumption, comprising a device of the server type according to claim 16, a plurality of terminals and a plurality of gateways, the plurality of gateways comprising subsets of gateways, each gateway in the subset being capable of relaying to a terminal a response to a message transmitted in an uplink frame by said terminal received by any other gateway in said subset, the gateways in the subset having at least one associated terminal in common.

* * * * *